United States Patent [19]

Dodds

[11] Patent Number: 4,578,541

[45] Date of Patent: Mar. 25, 1986

[54] TELEPHONE LINE INTERFACE CIRCUIT

[75] Inventor: David E. Dodds, Saskatoon, Canada

[73] Assignee: Danby Systems Ltd., Saskatoon, Canada

[21] Appl. No.: 544,952

[22] Filed: Oct. 24, 1983

[30] Foreign Application Priority Data

Aug. 26, 1983 [CA] Canada .................................. 435476

[51] Int. Cl.$^4$ ...................... H04M 3/02; H04M 19/02
[52] U.S. Cl. .......................... 179/18 FA; 179/18 HB; 179/51 AA; 179/84 R; 370/110.2
[58] Field of Search ........ 179/18 FA, 18 HB, 16 AA, 179/84 R, 84 A, 84 T, 81 B, 2 BC, 51 AA; 370/110.2

[56] References Cited

U.S. PATENT DOCUMENTS

| | | | |
|---|---|---|---|
| 2,797,261 | 6/1957 | Polyzou | 178/66 |
| 3,827,026 | 7/1974 | Viswanathan | 340/167 A |
| 3,849,734 | 11/1974 | Grass | 330/30 D |
| 3,868,519 | 2/1975 | Green | 307/270 |
| 3,875,332 | 4/1975 | Fletcher et al. | 178/58 A |
| 3,904,833 | 9/1975 | Beene et al. | 179/84 R |
| 3,927,266 | 12/1975 | Stewart et al. | 179/2.5 R |
| 4,001,515 | 1/1977 | Zorzy | 179/18 HB |
| 4,032,800 | 6/1977 | Dröscher et al. | 307/296 A |
| 4,227,053 | 10/1980 | Jacobson | 179/6 R |
| 4,341,927 | 7/1982 | Shinoi et al. | 179/2 DP |
| 4,349,703 | 9/1982 | Chea, Jr. | 179/18 HB |
| 4,354,062 | 10/1982 | Mussman | 179/84 A |
| 4,381,487 | 4/1983 | Erickson | 330/306 |
| 4,431,868 | 2/1984 | Bolus et al. | 179/18 FA |

FOREIGN PATENT DOCUMENTS 2443770 7/1980 France .

Primary Examiner—Gene Z. Rubinson
Assistant Examiner—Elio DiVito
Attorney, Agent, or Firm—Stanley G. Ade; Adrian D. Battison

[57] ABSTRACT

An interface circuit for providing power and signal voltages to a telephone line under the control of a microcomputer within the telephone exchange comprises four charge pumps, each comprising a pair of driver-/amplifiers which charge a pair of capacitors through a first diode with two further diodes discharging the capacitors to charge a capacitor connected across the telephone line. The four charge pumps are arranged symmetrically to provide positive or negative potential at the TIP terminal and positive or negative potential at the RING terminal. Modulation of the voltages to transmit a desired signal is obtained by modulating the power voltage supplied to the amplifier/drivers. The current drawn by the telephone line is measured by sensing the current drawn from the voltage source by the amplifier/drivers and this is used to extract the received signal from a telephone line and also to extract a measurement of peak current drawn from the TIP and RING leads separately. The amplifier/drivers are driven by continuous square wave signal.

27 Claims, 4 Drawing Figures

TELEPHONE LINE INTERFACE CIRCUIT

BACKGROUND OF THE INVENTION

This invention relates to a telephone line interface circuit and particularly to a circuit which can be controlled by a computer or microprocessor for providing power and signal voltages to a telephone line.

Circuits of this type are used in very large numbers in telephone exchanges for providing an interface between the exchange and the telephone lines of a subscriber or group of subscribers. For this reason the circuits involved are used in very large numbers and comprise a significant proportion of the cost of a telephone exchange. Considerable effort is currently expended in developing circuits for this function which are effective and yet are cheap to manufacture.

As is well known, the telephone lines provide a TIP wire and a RING wire and the required interface circuit needs to develop voltages across these wires to communicate the necessary control functions and power voltages to the subscribers' telephone equipment.

In addition, the circuit needs to extract from the lines and communicate to the lines the analogue, or in some cases digital, signals which provide the communication from the subscribers' telephone into the exchange and thence to a remote location, for example, a further subscriber.

Microprocessor control of the voltages applied to the line for the power and control functions is necessary to make the interface circuit compatible with microprocessor controlled exchange switching circuits which are now almost universal in regard to new installations. In addition, however, the circuit must be able to accommodate the voltages which are necessary to operate the old-fashioned electromechanical switching systems and subscriber equipment which are currently installed and which will remain in service for many years to come.

SUMMARY OF THE INVENTION

It is one object of the present invention therefore to provide a telephone interface circuit which provides all the requirements of such an interface circuit while being of a very simple and inexpensive nature which allows reduction in cost of the interface circuit in relation to presently existing circuits.

In accordance with the invention therefore there is provided an interface circuit for providing power and signal voltages to a telephone line comprising a pair of terminals for connecting the circuit to the TIP and RING wires of a telephone line, capacitance means connected across said terminals, charge pump means for charging said capacitance means including amplifier means, a plurality of capacitors and a plurality of diodes, a power supply voltage source for said amplifier means and means for supplying a continuous oscillating signal to said amplifier means whereby said amplifier means charge said capacitors during part of each cycle to said oscillating signal and said capacitors discharge through diodes during another part of said cycle to charge said capacitance means.

In accordance with a first important feature of the invention, the analogue voice signal can be communicated to the telephone line by modulating the voltage of the power source providing power to the amplifier means. The power supply voltage source can be modulated across a transistor with the signal applied to the base thereof so as to apply a small modulated signal together with the power voltage.

In accordance with a second important feature of the invention, the circuit can include four separate charge pump means controlled by separate ports of a microprocessor. Two of the charge pump means are arranged to charge a TIP capacitor to either a positive or a negative voltage and the other two charge pump means are arranged to charge a RING capacitor again to either positive or negative voltage. The open circuit voltage between TIP and RING is known as the battery voltage. In this way, battery voltages of +96V, +48V, −48V and −96V can be obtained across the TIP and RING terminals. The higher voltages are used on long telephone lines which have high resistance. These voltages also allow reverse battery signalling which is used in PBX exchanges and some pay telephones. In addition, a ringing signal can be applied by alternating between normal and reverse battery voltages. The oscillating frequency of the charge pump may be varied to produce a ringing voltage which is approximately sinusoidal. By switching between +96V and −48V, a DC bias may be placed on the ringing voltage. The ringing voltage may be increased by increasing the power supply voltage.

Divided ringing for party lines can be achieved by, for one party, making the RING negative and alternating the TIP voltage and for the other party, making the RING voltage alternate while keeping the TIP negative. One type of four-party automatic number identification can be achieved by applying simultaneously +48V followed by −48V to both TIP and RING wires.

In accordance with a further important feature of the invention, transistors are provided in the charge pump circuits to provide switches whereby the diodes of one charge pump circuit are prevented from discharging the respective capacitor while the capacitors of the symmetrical charge pump circuit are charging that capacitor.

In accordance with a yet further important feature of the invention, the current on the telephone line is detected by sensing the current drawn from the power source by the amplifier means. It will be appreciated that the current in the telephone line draws charge from the capacitance means connected across the terminals and this charge is replaced by charge provided by the charge pump means which in turn is replaced from the amplifier means. Provision of current by the charge pump means increases the current drawn by the amplifier means in the charge pump means from the power source.

Thus, the current drawn from the power source by the amplifier means is proportional to the current on the line.

The signal obtained by measuring the current can be used firstly by substracting from the obtained signal the transmitted modulated signal to leave a signal indicative of the mouthpiece signal from the subscriber's terminal. In addition, the obtained signal magnitude can be detected using a conventional ramp analogue to digital converter device to provide a digital signal indicative of the current in either the TIP lead or the RING lead for providing an output for off-hook and dial pulse detection. It can also be used to sense leakage current between the TIP wire and ground or between the RING wire and ground or between the RING wire and TIP wire.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
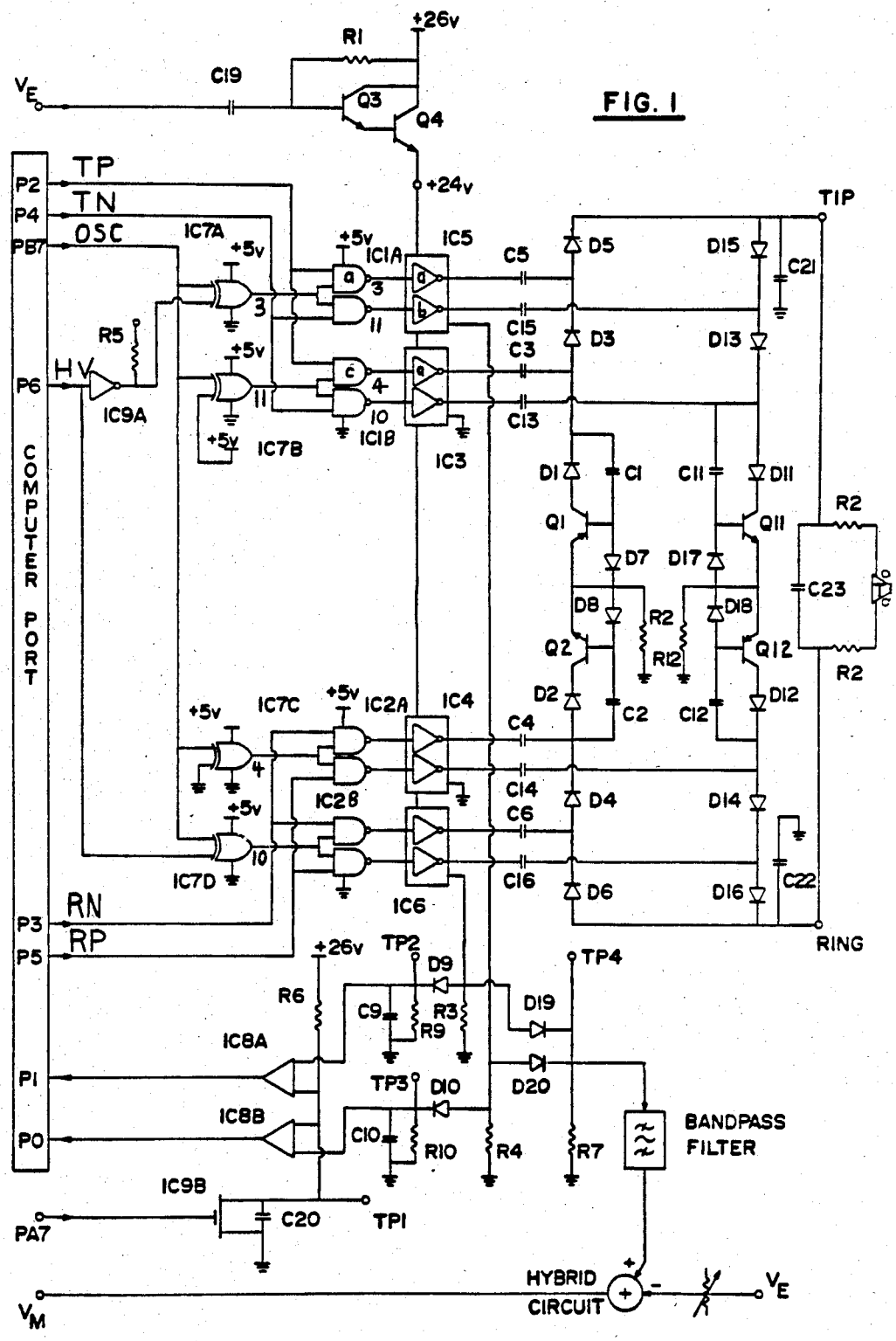
FIG. 1 is a circuit diagram of a telephone line interface circuit.

The total circuit is illustrated in FIG. 1 and provides an interface circuit between the telephone lines connected at the TIP and RING terminals and a telephone exchange which communicates control and signalling information with the interface circuit through the computer port. The subscriber signals are extracted from the telephone lines by the interface circuit and appear at Ve and Vm where Ve is the signal for transmission along the lines to the earpiece of the user telephone indicated at T and Vm is the signal received from the mouthpiece of the user telephone. These signals can be in analogue form or can, in some circumstances, be in digital form or can be converted to digital form within the exchange.

The circuit as shown is designed for operation by the user port of a Commodore VIC 20 personal microcomputer and modifications to the circuit to make it compatible with an exchange interface computer will be apparent to one skilled in the art.

The circuit basically comprises four separate charge pump circuits two associated with the TIP lead and two associated with the RING lead. A voltage is applied between the TIP lead and ground by using the charge pumps to charge the capacitor C21 to positive and negative values. Symmetrically, a voltage is applied to the RING lead relative to ground by charging a capacitor C22. A terminal P2 of the computer port controls the charging of the TIP lead to a positive voltage indicated by TP and terminal P4 supplies an enabling signal to charge the TIP lead to a negative voltage as indicated by TN. Symmetrically, terminals P3 and P5 supply enabling signals charging the RING lead to negative and positive voltages respectively.

The charging of the capacitors is driven by a square wave signal supplied by an oscillator terminal PB7. The square wave is supplied continuously and generally at a constant frequency but this frequency may lie in the range 250 KHz down to 1 KHz.

Figure 2:
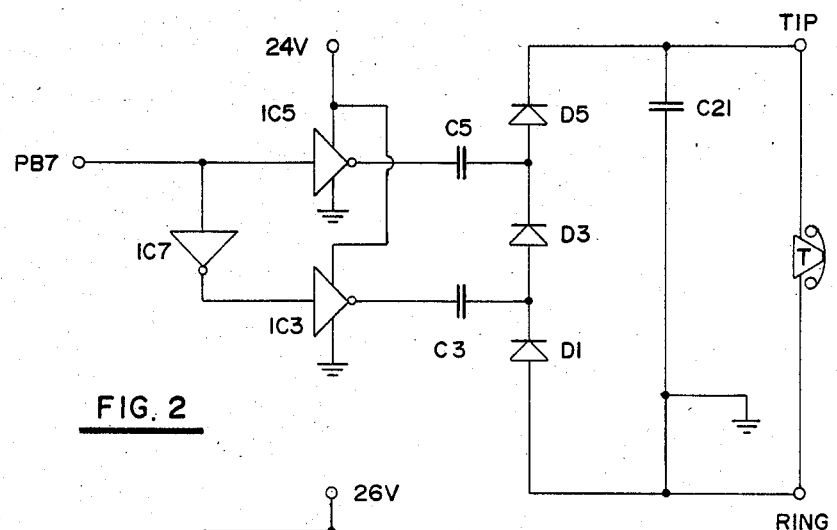
FIG. 2 is an extracted portion of the circuit of FIG. 1 showing a charge pump.

Turning to FIG. 2, a single charge pump circuit is illustrated comprising capacitors C5 and C3 diodes D5, D3 and D1 and part of the integrated circuits IC5 and IC3. The square wave signal is supplied to the amplifier of IC5 and is also inverted by the circuit IC7 so as to be supplied in inverted form to the amplifier of IC3. The amplifiers IC5, IC3 act as drivers or inverter/buffers with the output thereof following the square wave, but with one 180° out of phase with the other. The outputs are applied respectively to the capacitors C5 and C3. Assuming C5 and C3 have initially 0 voltage across them and assuming the output from IC5 initially switches from high to low and conversely the output of IC3 switches from low to high, since the voltage across C5 and C3 cannot change instantaneously the other terminals of C5 and C3 follow the change in outputs of IC5 and IC3. The voltage difference across the diode D3 approaches 0.7 volts and the diode begins to conduct. The capacitors charge until their added voltage equals the voltage difference between IC3 and IC5 minus one diode drop.

The capacitors have now been charged. The power voltage supplied to the amplifiers IC5, IC3 is at a nominal 24 volts therefore making a total voltage drop across the capacitors of 24 volts.

Under control of the square wave, the output from IC5 then switches from low to high and the output from IC3 switches from high to low when high is 24 volts and low is 0 volts. Since the voltage across C5 and C3 cannot change instantaneously, the other terminals of C5 and C3 follow the change in driver outputs. As the voltage difference across D3 changes to reverse bias, the charges stored in C5 and C3 flow through the circuit including diodes D5 and D1 and charge capacitor C21.

The process then continually repeats itself so the capacitor C21 is continually charged at 48 volts with current being supplied from the capacitors C5 and C3 only as capacitor C21 is discharged by current flowing in the TIP lead to the remote telephone T.

Figure 3:
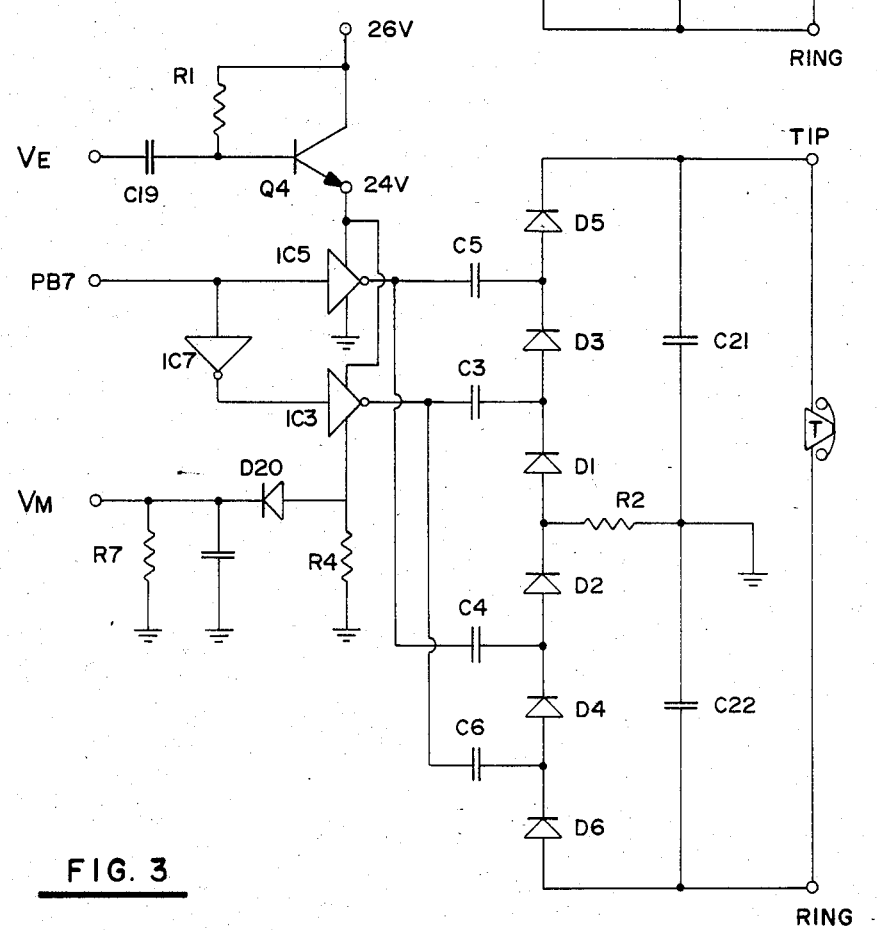
FIG. 3 is an extracted portion of the circuit of FIG. 1 showing two charge pumps for the TIP and RING leads respectively together with the input voltage modulation.

FIG. 3, in addition to the single charge pump shown in FIG. 2, includes a second charge pump provided by capacitors C4 and C6 and diodes D2, D4 and D6 which in a symmetrical manner to the first charge pump, acts to charge the capacitor C22 to provide a negative voltage at the RING terminal.

Figure 4:
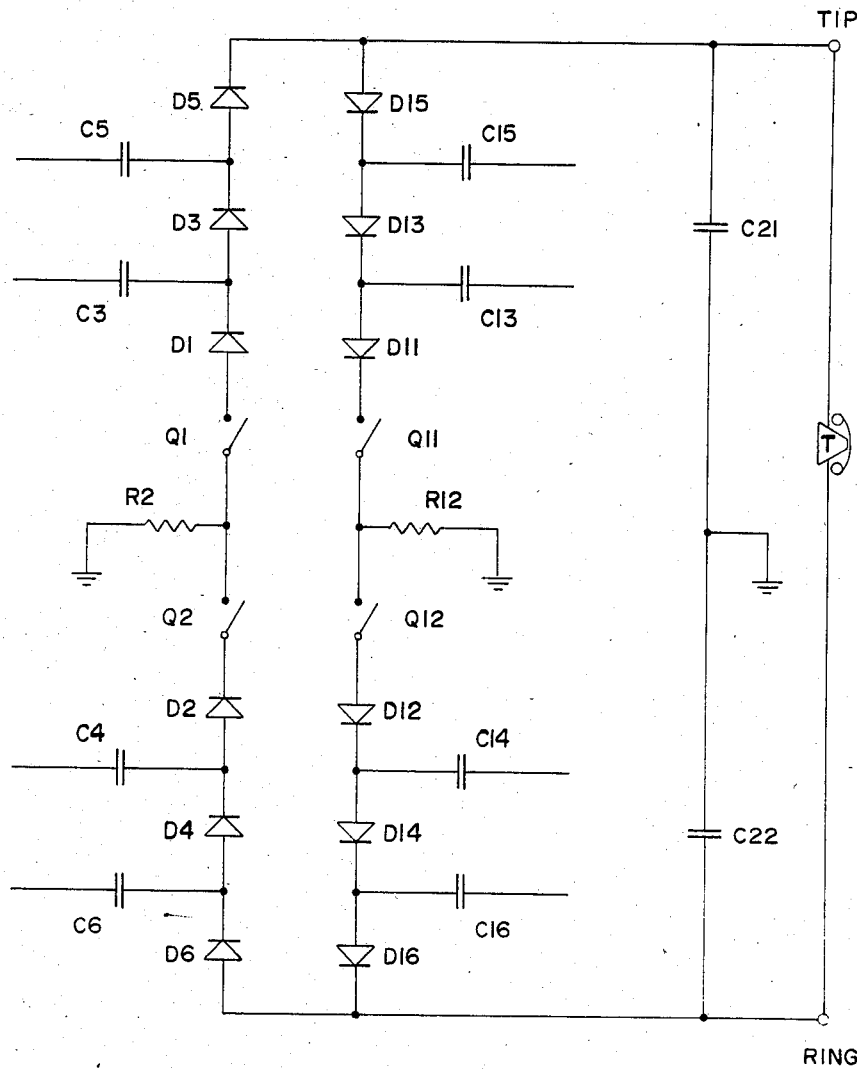
FIG. 4 is a further portion extracted from FIG. 1 showing schematically the arrangement of switches which control the positive and negative charging of the capacitors across the TIP and RING lines.

FIG. 4 is yet further modified to show the four symmetrically arranged charge pumps. Thus, a further charge pump provided by capacitors C15, C13 and diodes D15, D13, D11 is provided and oriented so as, when enabled, to charge the capacitor C21 to a negative voltage of 48 volts. Symmetrically, a charge pump provided by capacitors C14, C16 and diodes D12, D14, D16 can, when enabled, charge the capacitor C22 to a positive voltage. Thus, the voltage across the TIP and RING terminals can, in accordance with signals provided by the computer port, be controlled to +96V, +48V, −48V and −96V.

In view of the connection of the diode circuits provided by D5, D3, D1 and D15, D13, D11 to the capacitor C21 to provide charge pumps charging the capacitor C21 to the desired potential, switches Q1 and Q11 are incorporated so that the circuit which is not enabled is disconnected in order to prevent discharge of the capacitor directly to ground or to the other wire. Symmetrically, switches Q2 and Q12 are provided for the charge pumps of capacitors C22.

Turning now to FIG. 1, the four charge pumps illustrated in FIG. 4 will be apparent and the control of those charge pumps is obtained from the terminals P2, P4, P3, P5 via gates IC1A, IC1B and IC2A, IC2B. In addition, terminal P6 provides a phasing signal controlling the phase of the oscillating signals applied to the above gates. The phasing signal is indicated at HV.

Specifically, therefore, the square wave signal indicated at OSC is supplied from the terminal PB7 and enters a quad exclusive or circuit comprising gates IC7A, IC7B, IC7C and IC7D. The exclusive or gate IC7A is connected to the signal HV after inversion by an inverter IC9A. In addition, the gate IC7D is connected directly to the enabling signal HV. IC7B is connected to a voltage supply of 5 volts and IC7C is connected to ground with the other terminals of each of the gates being connected to the square wave signal OSC. Thus when HV is at +5V, the output pins 3, 11, 4, 10 will carry the signals OSC $\overline{OSC}$ or the inversion of OSC, OSC and $\overline{OSC}$ respectively. These signals then enter the quad NAND circuits IC1A, IC1B and IC2A, IC2B which steer the oscillating signals to the charge pumps. In one example, if TP is enabled and TN, RN and RP are disabled, the signals OSC and $\overline{OSC}$ only appear at the output terminals of IC1a and IC1c so as to drive the capacitors C5 and C3 through the amplifiers IC5 and IC3. Thus, the first charge pump described above is enabled to charge the capacitor C21 to +48 volts thus applying a positive voltage at the TIP lead with the RING lead remaining at ground potential.

The switches Q1, Q2, Q11, Q12 are provided by transistors as shown. The base of the transistor Q1 is connected to the base of transistor Q2 through diodes D7, D8 and thence to the capacitor C4 through capacitor C2.

In the other direction, the base of the transistor Q1 is connected to the capacitor C3 through a further capacitor C1. Symmetrically, the base of the transistor Q11 is connected to the transistor Q12 via diodes D17, D18 and thence to the capacitor C14 through a further capacitor C12. In addition, the base of the transistor Q11 is connected to the capacitor C13 via a further capacitor C11.

Since in the above condition where TN is disabled, there is no oscillating signal connected to capacitor C13, there is no base current in Q11 and that transistor will remain off, disconnecting the diodes D15, D13, D11 from the circuit to ground from the capacitor C21. Thus, the capacitor C21 will not be discharged to ground through those diodes while being charged to the positive potential through the diodes D1, D3, D5.

If both TP and RN inputs are enabled, in addition to the above condition, the signals OSC and $\overline{OSC}$ drive capacitors C4 and C6 forming a second charge pump including D2, D4 and D6. Capacitor C22 is therefore charged making the RING wire negative with respect to ground. Transistor Q12 is turned off which prevents discharge of capacitor C22 through diodes D12, D14, D16.

Transistors Q1 and Q2 in this condition are turned on during each half cycle when driver output supplying capacitor C4 is at high potential and driver output supplying capacitor C3 is at low potential. The transition leading to this state causes current flow through capacitor C2, the base-emitter of Q2, the emitter-base of Q1 and finally capacitor C1. This current turns on both transistors. After the transition which drives C3 high and C4 low, the capacitors C1 and C2 are re-charged through diodes D7 and D8 during the opposite half cycle while transistors Q1 and Q2 remain off but do not interfere with the operation of the charge pumps.

The remaining conditions provided by enabling TN and/or RP operate in symmetrical arrangement which can be followed merely by observing the symmetry of the circuit. In this way, the above described TIP and RING voltages can be obtained under the control of the computer port.

In the case when HV=0v, the output pins 3, 11, 4 and 10 carry the signals $\overline{OSC}$, $\overline{OSC}$, OSC and OSC. Each charge pump will develop only 24 volts and the maximum voltage between the TIP and RING terminals is therefore 48 volts.

Turning now to the transmission and reception of the Ve and Vm signals across the TIP and RING terminals, the transmitted signal Ve is supplied at the terminal Ve shown in FIG. 1 and also shown in a simplified form in FIG. 3. This terminal supplies the modulated analogue signal for transmission to the earpiece of the remote telephone. The signal is transmitted through a capacitor C19 to the base of a transistor Q3. The emitter of the transistor Q3 is connected to the base of a transistor Q4 with collectors of both transistors connected to a positive voltage which is 2 volts above the nominal voltage supplied to the amplifiers IC5, IC3 and also the symmetrical amplifiers IC4 and IC6. The transistors Q3 and Q4 introduce a 2-volt potential drop between the 26 volt battery supply and the nominal potential supplied to the amplifiers. This 2-volt drop is varied or modulated in accordance with the signal supplied at the terminal Ve. This modulates the amplitude of the 24-volt square waves and therefore varies the voltage generated between TIP and RING terminals for communication to the telephone earpiece of the remote telephone T.

Turning now to the measurement of the current drawn through the TIP and RING terminals by the remote telephone, this is measured by measuring the current drawn by the capacitors C5 and C15, which charge the capacitor C21, and by the capacitors C6 and C16, which charge the capacitor C22. Thus, the current drawn from these capacitors is determined by measuring the current drawn from the power source by the integrated circuit IC5 and separately by the integrated circuit IC6. It will be appreciated that the current drawn by the circuit IC5 is proportional to the charge required to re-charge the capacitor C21 and symmetrically the current drawn by the circuit IC6 is proportional to the charge required to re-charge the capacitor C22. For this reason, the separate amplifiers of the circuit IC5 which are associated with separate charge pumps are combined into a single circuit thus enabling a simpler measurement of the total charge drawn by the capacitor C21.

The current drawn by IC5 is sensed across a resistor R4. Firstly, the peaks of the current are detected using a peak detecting circuit comprising diode D10, resistor R10 and capacitor C10 which is applied to a comparator IC8B. At the same time, the sensed current is passed through a diode D20 and produces a modulated voltage across resistor R7.

In a symmetrical manner, the current drawn by IC6 is sensed across a resistor R3 and communicated firstly to a peak detector comprising diode D9, resistor R9 and capacitor C9 and supplied to a comparator IC8A and secondly, is applied across the resistor R7 by a diode D19.

The average voltage applied across the resistor R7 through the diodes D19 and D20 is proportional to the current passing through the TIP and RING leads and therefore any modulation thereof is proportional to the signals communicated on the telephone lines. This signal is applied to a band pass filter and amplifier having a filter range of 300 Hz to 3400 Hz to extract analogue voice signals. This extracted signal is proportional to a combination of the transmitted Ve signal and also the received Vm signal. The Vm signal is extracted from the total by a hybrid circuit of conventional form which receives from the terminal Ve, the transmitted signal and substracts it from the combined signal to leave Vm which is communicated to the terminal for transmission through the exchange to the remote connection.

The outputs from the peak detecting circuits as applied to the comparators IC8A and IC8B are converted into digital form by a conventional ramp analogue to digital converter technique. In accordance with this technique, a ramp circuit receives an input from the terminal PB7 and causes the ramp circuit to provide a linearly increasing voltage commencing at 0 volts which voltage is developed at terminal TP1. The ramp voltage is applied to the other terminals of the comparators IC8A, IC8B. When the ramp voltage at TP1 becomes equal to the peak detected output, the comparator circuits IC8A, IC8B change state. The time from the initial signal from the terminal PA7 to the change of state of the comparators is measured by the computer attached to the terminals P1, P0 and PA7 whereby digital pulse width signals indicative of the peak current drawn from the TIP and RING lead respectively are supplied to the terminals P0 and P1. These digital pulse width signals can be used to detect off hook and dial pulse signals on the line. It can also be used to sense leakage current between the TIP wire and RING wire or between the TIP wire and ground and between the RING wire and ground for line test purposes.

The interface circuit described above therefore enables power voltages and signal voltages to be developed across the TIP and RING terminals and these voltages can be used for controlling the remote telephone equipment and for transmitting the signals to and from the remote telephone equipment. The development of the voltages is under the control of the microcomputer. The circuit is therefore of a very simple nature and is readily compatible with microcomputers currently used in the telephone exchange systems.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. An interface circuit for providing power and signal voltages to a transmission line, said interface circuit comprising:
   first and second terminal means respectively for connecting the circuit to the TIP and RING wires of a transmission line;
   capacitance means connected with said terminal means;
   charge pump means for charging said capacitance means, said charge pump means including:
   a first diode means; a second diode means having first and second leads;
   and first and second isolating capacitor means each including an input side lead and a line side lead, said line side lead of said first isolating capacitor means being connected with said first lead of said second diode means and said line side lead of said second isolating capacitor means being connected with said second lead of said second diode means;
   said first diode means being connected in series with said first lead of said second diode means, said first and second diode means being connected in series between said first and second terminal means for permitting passage of current in one direction between said first and second terminal means;
   driving voltage means for alternately applying positive and negative voltage differences between said input side lead of said first isolating capacitor means and said input side lead of said second isolating capacitor means; and
   a controlling means for controlling said driving voltage means, said controlling means comprising:
   mode control means for starting and stopping application of said alternating positive and negative voltage differences and
   modulating means for modulating said alternating positive and negative voltage differences in response to an input signal.

2. An interface circuit as claimed in claim 1 wherein said charge pump means further comprises:
   a third diode means connected in series with said second lead of said second diode means, said first, second, and third diode means being connected in series between said first and second terminal means for permitting passage of current in one direction between said first and second terminal means.

3. A circuit according to claim 2 wherein said capacitance means comprises:
   a first capacitor connected to said TIP terminal and a second capacitor connected to said RING terminal; and
   wherein there are provided first and second charge pump means in series relationship each for charging a respective one of said first and second capacitors.

4. A circuit according to claim 2 wherein said driving voltage means comprises:
   a pair of buffers;
   a power source for said buffers;
   means for applying an oscillating signal to one of said buffers and an inversion of said oscillating signal to the other said buffer;
   and wherein the output of one of said buffers is connected with the input side lead of said first isolating capacitor means and the output of the other said buffer is connected with the input side lead of said second isolating capacitor means.

5. A circuit according to claim 3 wherein said first charge pump means is arranged to charge said first capacitor to a positive voltage and
   wherein said second charge pump means is arranged to charge said second capacitor to a negative voltage
   and including third charge pump means for charging said first capacitor to a negative voltage
   and fourth charge pump means for charging said second capacitor to a positive voltage.

6. A circuit according to claim 5 including a plurality of computer ports and means for operating said mode control means in dependence upon control signals at said ports.

7. A circuit according to claim 5 wherein said driving voltage means of each charge pump means comprises:
   a pair of buffers;
   a power source for said buffers;

and means for applying an oscillating signal to one of said buffers and an inversion of said oscillating signal to the other said buffer;

and wherein the output of one of said buffers is connected with the input side lead of said first isolating capacitor means and the output of the other said buffer is connected with the input side lead of said second isolating capacitor means.

8. A circuit according to claim 7 wherein one buffer of said first charge pump means and one buffer of said third charge pump means are connected and there is provided means for sensing the current drawn by said connected buffers to provide a signal representative of current on said TIP line and wherein one buffer of the second charge pump means and one buffer of the fourth charge pump means are connected and there is provided means for sensing the current drawn by said other connected buffers to provide a signal representative of current on said RING line.

9. A circuit according to claim 5 including:
first switch means for preventing said diode means of said third charge pump means from discharging said first capacitor when said first charge pump means is charging said first capacitor;
second switch means for preventing said diode means of said fourth charge pump means discharging said second capacitor when said second charge pump means is charging said second capacitor;
third switch means for preventing said diode means of said first charge pump means discharging said first capacitor when said third charge pump means is charging said first capacitor;
and fourth switch means for preventing said diode means of said second charge pump means discharging said second capacitor when said fourth charge pump means is charging said second capacitor.

10. A circuit according to claim 2 including:
in addition to said charge pump means a further charge pump means for charging said capacitance means to the opposite polarity voltage;
first switch means for preventing said diodes of said charge pump means from discharging said capacitance means when said further charge pump means is charging said capacitance means; and
second switch means for preventing said diodes of said further charge pump means discharging said capacitance means when said charge pump means is charging said capacitance means.

11. A circuit according to claim 10 wherein each of said switch means comprises one of either a transistor or a thyristor arranged to conduct upon operation of associate charge pump means in series relationship with said one of either a transistor or a thyristor.

12. A circuit according to claim 10, wherein said driving voltage means of each charge pump means comprises:
a pair of buffers, the output of one of said buffers being connected with the input side lead of said first isolating capacitor means and the output of the other said buffer being connected with the input side lead of said second isolating capacitor means;
a power source for said buffers; and
means for applying an oscillating signal to one of said buffers and an inversion of said oscillating signal to the other said buffer,
and wherein there is provided means for sensing the current drawn by at least one of said buffers of said charge pump means and at least one of said buffers of said further charge pump means from said power source to provide a signal representative of current on said transmission line.

13. A circuit according to claim 3 wherein said driving voltage means of each charge pump means comprises:
a pair of buffers, the output of one of said buffers being connected with the input side lead of said first isolating capacitor means and the output of the other said buffer being connected with the input side lead of said second isolating capacitor;
a power source for said buffers; and
means for applying an oscillating signal to one of said buffers and an inversion of said oscillating signal to the other said buffer,
and wherein there is provided means for sensing the current drawn by at least one of said buffers of said first charge pump means and at least one of said buffers of said second charge pump means from said power source to provide a signal representative of current on said transmission line.

14. A circuit according to claim 4 including means for sensing the current drawn by at least one of said buffers from said power source to provide a signal representative of current on said transmission line.

15. A circuit according to claim 4 wherein said buffers are amplifiers and, wherein said modulating means for controlling said driving voltage means comprises means for amplitude modulating, in accordance with said input signal, the voltage from said power source to said amplifiers whereby to modulate the amplification of said oscillating signals.

16. An interface circuit as claimed in claim 4 wherein said modulating means for controlling said driving voltage means includes means for amplitude modulating said alternating positive and negative voltage differences in response to an input signal.

17. An interface circuit as claimed in claim 4 wherein said modulating means for controlling said driving voltage means includes means for modulating the frequency of alternation of said alternating positive and negative voltage differences in response to an input signal.

18. An interface circuit as claimed in claim 5 wherein at least one of said modulating means for controlling said driving voltage means includes means for amplitude modulating said alternating positive and negative voltage differences in response to an input signal.

19. An interface circuit as claimed in claim 5 wherein at least one of said modulating means for controlling said driving voltage means includes means for modulating the frequency of alternation of said alternating positive and negative voltage differences in response to an input signal.

20. An interface circuit as claimed in claim 7 wherein at least one of said modulating means for controlling said driving voltage means includes means for amplitude modulating said alternating positive and negative voltage differences in response to an input signal.

21. An interface circuit as claimed in claim 7 wherein at least one of said modulating means for controlling said driving voltage means includes means for modulating the frequency of alternation of said alternating positive and negative voltage differences in response to an input signal.

22. An interface circuit as claimed in claim 3 wherein at least one of said modulating means for controlling said driving voltage means includes means for amplitude modulating said alternating positive and negative voltage differences in response to an input signal.

23. An interface circuit as claimed in claim 3 wherein at least one of said modulating means for controlling said driving voltage means includes means for modulating the frequency of alternation of said alternating positive and negative voltage differences in response to an input signal.

24. An interface circuit as claimed in claim 12 wherein at least one of said modulating means for controlling said driving voltage means includes means for amplitude modulating said alternating positive and negative voltage differences in response to an input signal.

25. An interface circuit as claimed in claim 12 wherein at least one of said modulating means for controlling said driving voltage means includes means for modulating the frequency of alternation of said alternating positive and negative voltage differences in response to an input signal.

26. An interface circuit as claimed in claim 1 wherein said modulating means for controlling said driving voltage means includes means for amplitude modulating said alternating positive and negative voltage differences in response to an input signal.

27. An interface circuit as claimed in claim 1 wherein said modulating means for controlling said driving voltage means includes means for modulating the frequency of alternation of said alternating positive and negative voltage differences in response to an input signal.

* * * * *